United States Patent
Chang et al.

(10) Patent No.: US 9,680,354 B2
(45) Date of Patent: Jun. 13, 2017

(54) WINDING COOLING STRUCTURE OF SHAFT MOTOR

(71) Applicant: HIWIN MIKROSYSTEM CORP., Taichung (TW)

(72) Inventors: Yu-Jung Chang, Taichung (TW); Chih-Kai Fan, Taichung (TW); Sheng-Shiun Huang, Taichung (TW)

(73) Assignee: HIWIN MIKROSYSTEM CORP., Taichung (TW)

( * ) Notice: Subject to any disclaimer, the term of this patent is extended or adjusted under 35 U.S.C. 154(b) by 322 days.

(21) Appl. No.: 14/540,998

(22) Filed: Nov. 13, 2014

(65) Prior Publication Data

US 2016/0141938 A1     May 19, 2016

(51) Int. Cl.
| | | |
|---|---|---|
| *H02K 9/197* | (2006.01) | |
| *H02K 3/24* | (2006.01) | |
| *H02K 41/03* | (2006.01) | |
| *H02K 33/12* | (2006.01) | |

(52) U.S. Cl.
CPC .......... *H02K 9/197* (2013.01); *H02K 41/031* (2013.01); *H02K 3/24* (2013.01); *H02K 33/12* (2013.01)

(58) Field of Classification Search
CPC .......... H02K 3/24; H02K 9/197; H02K 33/12; H02K 41/031
USPC ............................................. 310/52, 58, 54
IPC .................................... H02K 3/24,9/197, 41/03
See application file for complete search history.

(56) References Cited

U.S. PATENT DOCUMENTS

| | | | | |
|---|---|---|---|---|
| 5,313,125 A | * | 5/1994 | Bosman ................. | H02K 1/185 310/49.18 |
| 7,939,974 B2 | * | 5/2011 | Chao ..................... | H02K 41/03 310/12.29 |
| 8,098,987 B2 | * | 1/2012 | Hattori ............... | H04B 10/0799 398/17 |
| 8,362,860 B2 | * | 1/2013 | Ohashi .................. | H02K 55/02 310/51 |
| 2008/0149303 A1 | * | 6/2008 | Chang ................... | H02K 41/03 165/80.2 |
| 2008/0253907 A1 | * | 10/2008 | Lind ...................... | F04D 25/04 417/354 |
| 2009/0220361 A1 | * | 9/2009 | Lind ...................... | F04D 25/04 417/423.7 |
| 2016/0141938 A1 | * | 5/2016 | Chang ................. | H02K 41/031 310/54 |

FOREIGN PATENT DOCUMENTS

JP            11206099 A   *   7/1999

OTHER PUBLICATIONS

Ishiyama et al, JP 11206099A, English Abstract, Jul. 1999.*

* cited by examiner

*Primary Examiner* — John K Kim
(74) *Attorney, Agent, or Firm* — Guice Patents PLLC

(57) ABSTRACT

A winding cooling structure of shaft motor includes a chamber in which multiple annular windings are received. A cooling fluid is filled up in the chamber to possibly contact the surfaces of every part of the respective windings. Therefore, heat generated by the windings can be quickly transferred to the cooling fluid around the windings and dissipated. Accordingly, in operation, the heat dissipation efficiency of the shaft motor can be enhanced to prolong lifetime of the motor and ensure the performance of the motor.

7 Claims, 8 Drawing Sheets

WINDING COOLING STRUCTURE OF SHAFT MOTOR

BACKGROUND OF THE INVENTION

1. Field of the Invention

The present invention relates generally to a motor, and more particularly to a winding cooling structure of shaft motor.

2. Description of the Related Art

In operation, a motor will generate heat to cause rise of temperature of the motor. In case the motor is under a high-temperature condition for a long time, the windings are likely to damage due to overheating. Also, the permanent magnet will be demagnetized to deteriorate the performance of the motor. In order to avoid overheating of the motor, after powered on, the heat generated by the windings is often dissipated by way of conduction or convection. Various heat dissipation structures have been disclosed for dissipating the heat generated by the windings.

FIG. 1 shows a conventional shaft motor, which dissipates the heat by way of natural convection. The housing 1 of the mover of the shaft motor is formed with multiple heat dissipation passages 2 for airflow. When the mover reciprocally moves, the air continuously flows within the heat dissipation passages to dissipate the heat by way of natural convection.

In the above shaft motor, the heat is dissipated by natural intake of air. The heat dissipation effect achieved by such means is limited. Therefore, FIG. 2 shows an improved shaft motor, which dissipates the heat by way of forced convection. As shown in FIG. 2, external high-pressure air is conducted into the gap 5 between the tubular mover 3 and the shaft stator 4 of the shaft motor so as to enhance the heat dissipation effect.

Furthermore, the heat conductivity of air is lower so that water with higher heat conductivity can be selected as a cooling fluid to dissipate the heat by way of convection. FIG. 3 shows a conventional water-cooled shaft motor. A hollow annular section 6 is sandwiched between the tubular mover and shaft stator of the shaft motor. The water flows within the interior space of the annular section 6 to provide a higher heat dissipation effect.

The above conventional techniques are applied to the shaft motor to enhance the convection and heat conduction and dissipation effect. However, as shown in FIG. 1, the air simply flows through the surrounding of the tubular windings to conduct heat to the housing byway of natural convection for dissipating the heat. Also, as shown in FIGS. 2 and 3, only the inner circumference of the tubular windings serves to provide a heat dissipation path. All the above conventional techniques can only achieve limited heat dissipation effect so that the heat generated by the windings as the main heat source can be hardly fully dissipated.

SUMMARY OF THE INVENTION

It is therefore a primary object of the present invention to provide a winding cooling structure of shaft motor, which includes a chamber in which multiple annular windings are received. A cooling fluid is filled up in the chamber. The heat generated by the windings can be quickly transferred to the cooling fluid around the windings and dissipated. Accordingly, in operation, the heat dissipation efficiency of the shaft motor can be enhanced to prolong lifetime of the motor and ensure the performance of the motor.

To achieve the above and other objects, the winding cooling structure of shaft motor of the present invention includes a chamber in which multiple annular windings are received. A cooling fluid is filled up in the chamber to possibly contact the surfaces of every part of the respective windings. Therefore, heat generated by the windings can be quickly transferred to the cooling fluid around the windings and dissipated.

To speak more specifically, the winding cooling structure of shaft motor of the present invention includes: a mover seat having a tubular body section, a closed annular chamber being coaxially formed in the body section; multiple annular windings serially connected with each other and coaxially received in the chamber; and a predetermined volume of cooling fluid contained in a space around the windings and filled up in the chamber.

In the above winding cooling structure of shaft motor, in order to easily form and seal the chamber, the body section further includes an inner tube, a tubular housing coaxially fitted around the inner tube and two end pieces respectively disposed at two axial ends of the housing in abutment against two axial ends of the inner tube, whereby a space is defined between inner circumference of the housing and outer circumference of the inner tube as the chamber, the chamber being sealed by the end pieces.

In the above winding cooling structure of shaft motor, the body section further includes two annular insertion grooves respectively coaxially formed on the end pieces. Two axial ends of the inner tube are respectively inserted in the insertion grooves.

In the above winding cooling structure of shaft motor, the inner diameter of the housing is larger than the outer diameter of the windings and the outer diameter of the inner tube is smaller than the inner diameter of the windings. Accordingly, the space around the windings is as enlarged as possible to contain the cooling fluid for contacting the surfaces of every part of the respective windings.

In the above winding cooling structure of shaft motor, the cooling fluid can be air or a coolant.

In the case that the cooling fluid is a coolant, in order to avoid leakage of the cooling fluid, the chamber must be airtight. In order to achieve this object, the body section further includes two first sealing rings respectively clamped between two ends of the housing and the end pieces and two second sealing rings respectively clamped between the inner tube and the end pieces.

In addition, in order to enhance the heat dissipation efficiency, the cooling fluid must continuously flow. To achieve this object, the mover seat further includes an inlet passage and an outlet passage. The inlet passage and the outlet passage are spaced from each other and respectively disposed on the body section in communication with the chamber. Accordingly, the cooling fluid can flow into the chamber from outer side through the inlet passage and then flow out of the chamber from the outlet passage.

In the above winding cooling structure of shaft moto, the inlet passage and the outlet passage are respectively positioned on one side of the body section in adjacency to two axial ends thereof.

The present invention can be best understood through the following description and accompanying drawings, wherein:

DETAILED DESCRIPTION OF THE PREFERRED EMBODIMENTS

Figure 1:
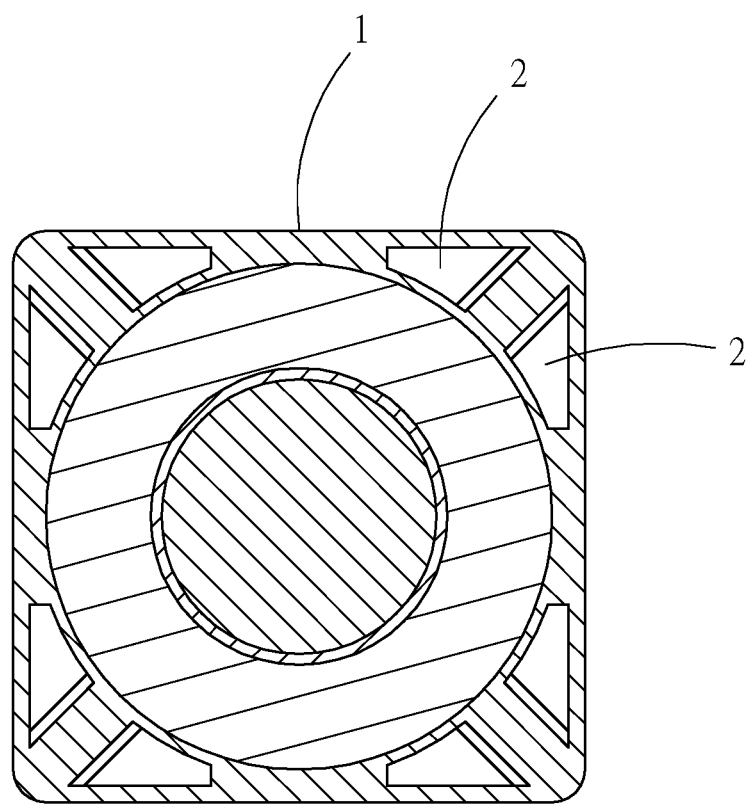
FIG. 1 is a sectional view of a conventional shaft motor, which dissipates the heat by way of natural convection.
Figure 2:
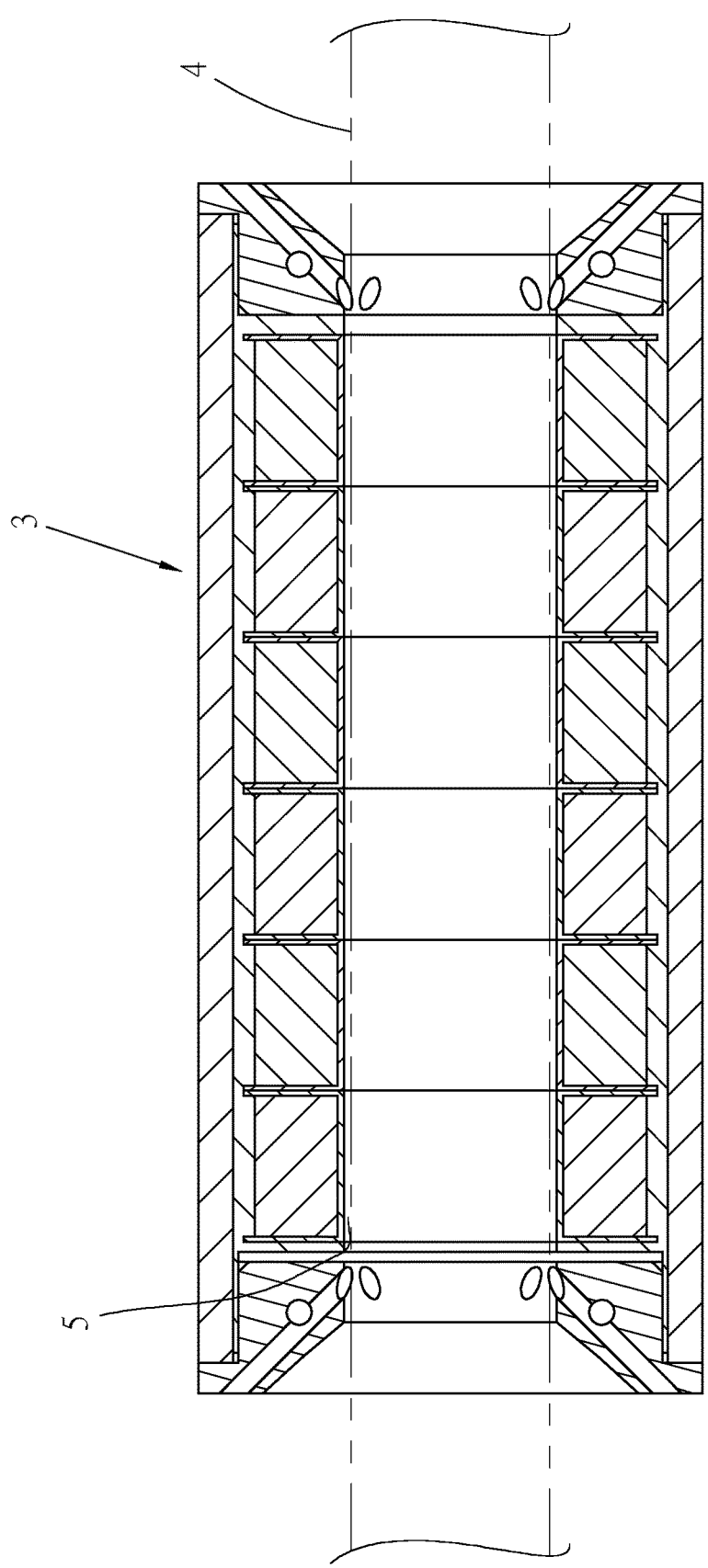
FIG. 2 is a sectional view of a conventional shaft motor, which dissipates the heat by way of forced convection.
Figure 3:
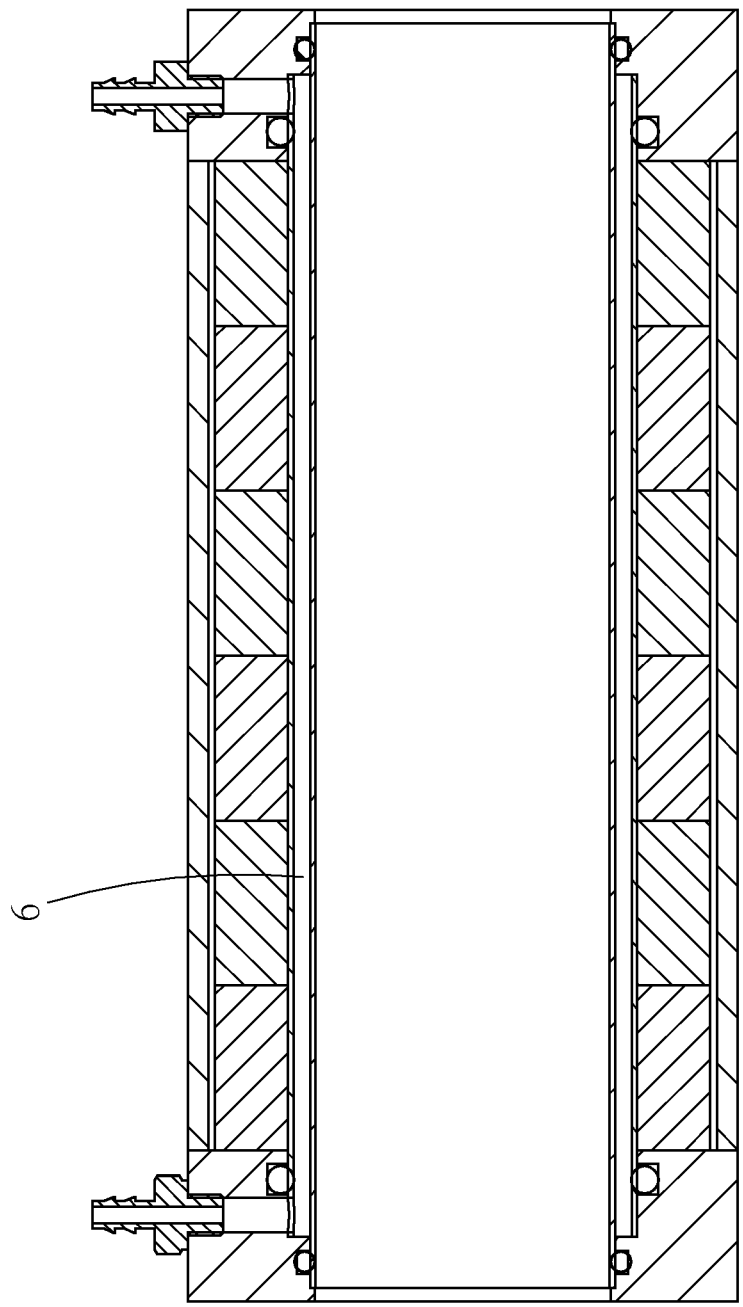
FIG. 3 is a sectional view of a conventional water-cooled shaft motor.
Figure 4:
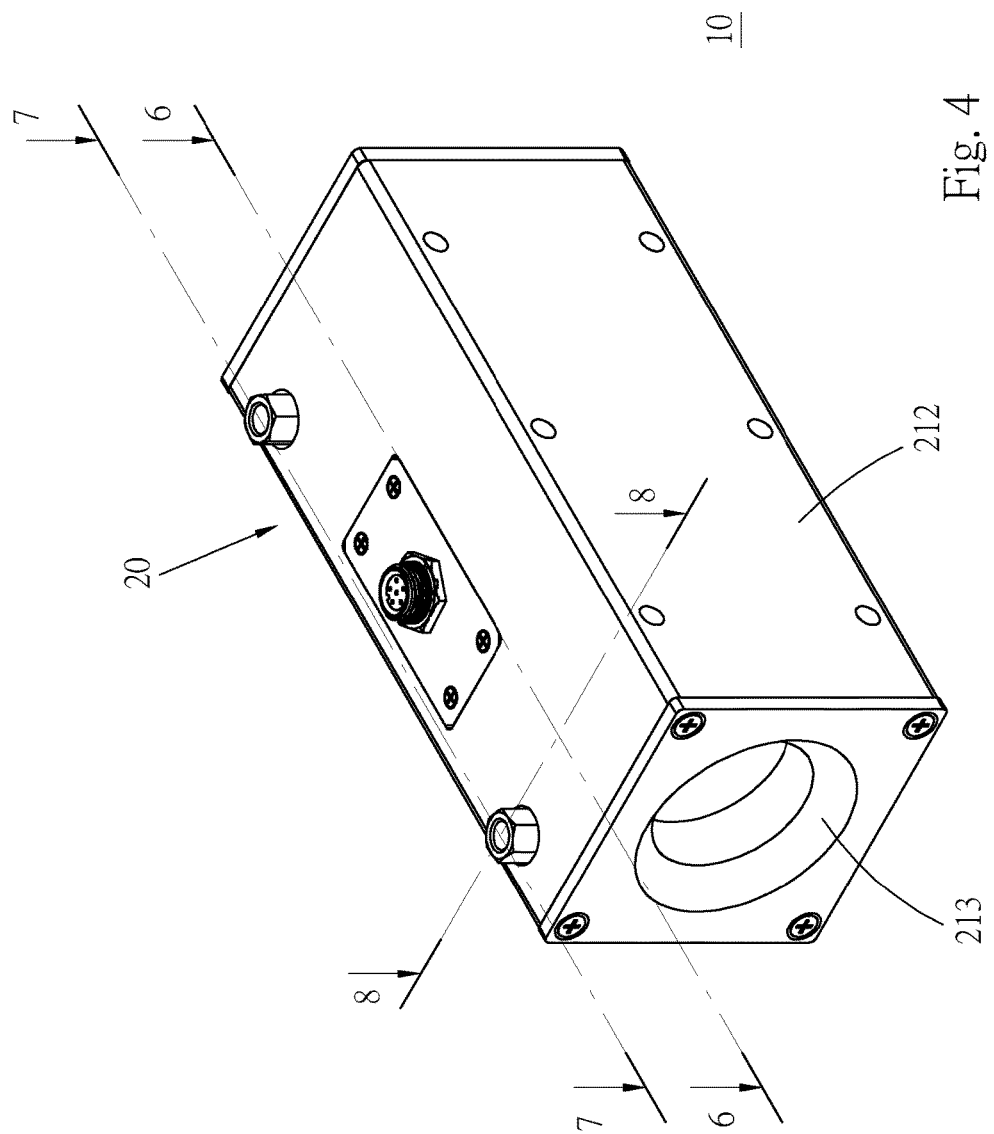
FIG. 4 is a perspective assembled view of a preferred embodiment of the present invention.
Figure 5:
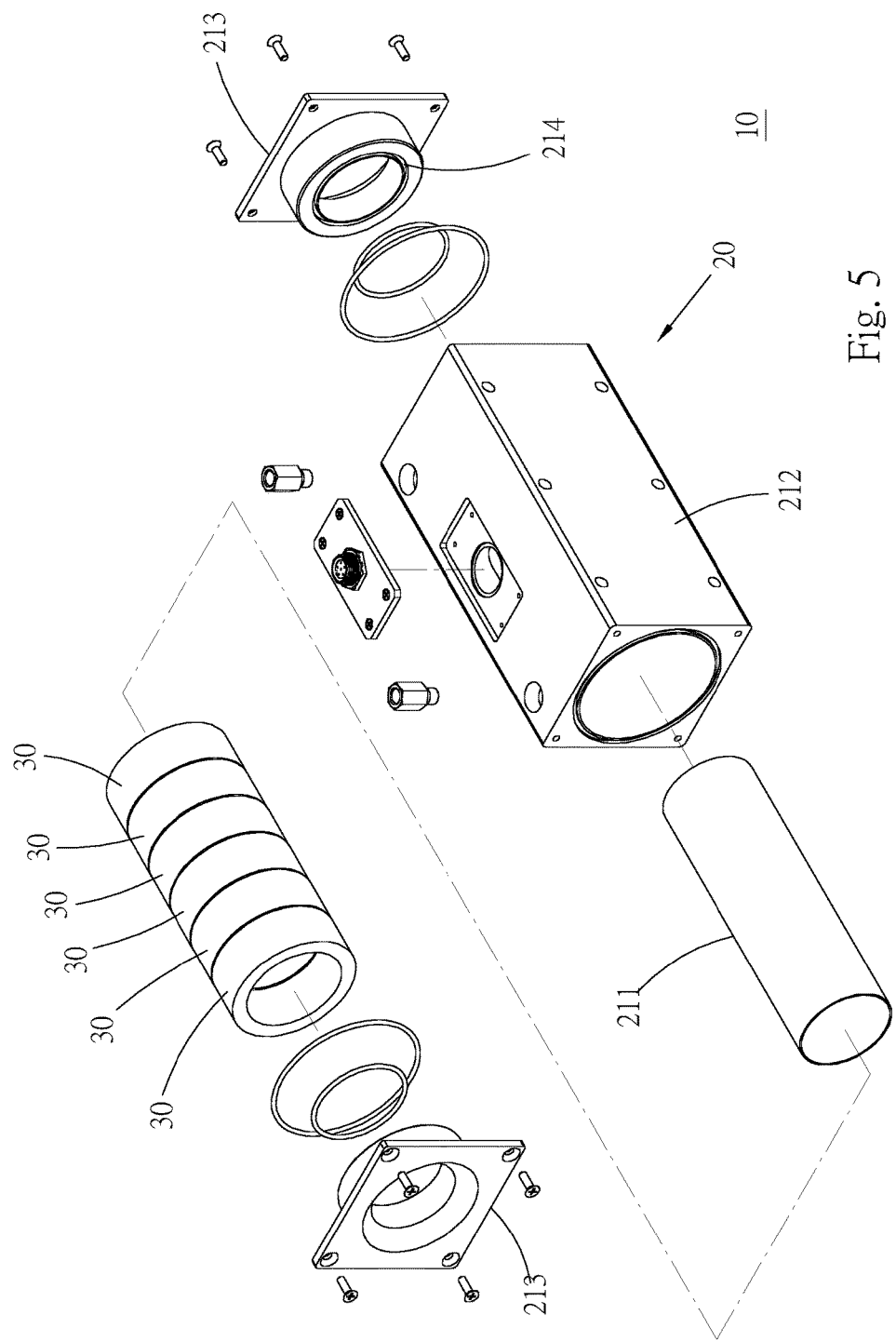
FIG. 5 is a perspective exploded view of the preferred embodiment of the present invention.
Figure 6:
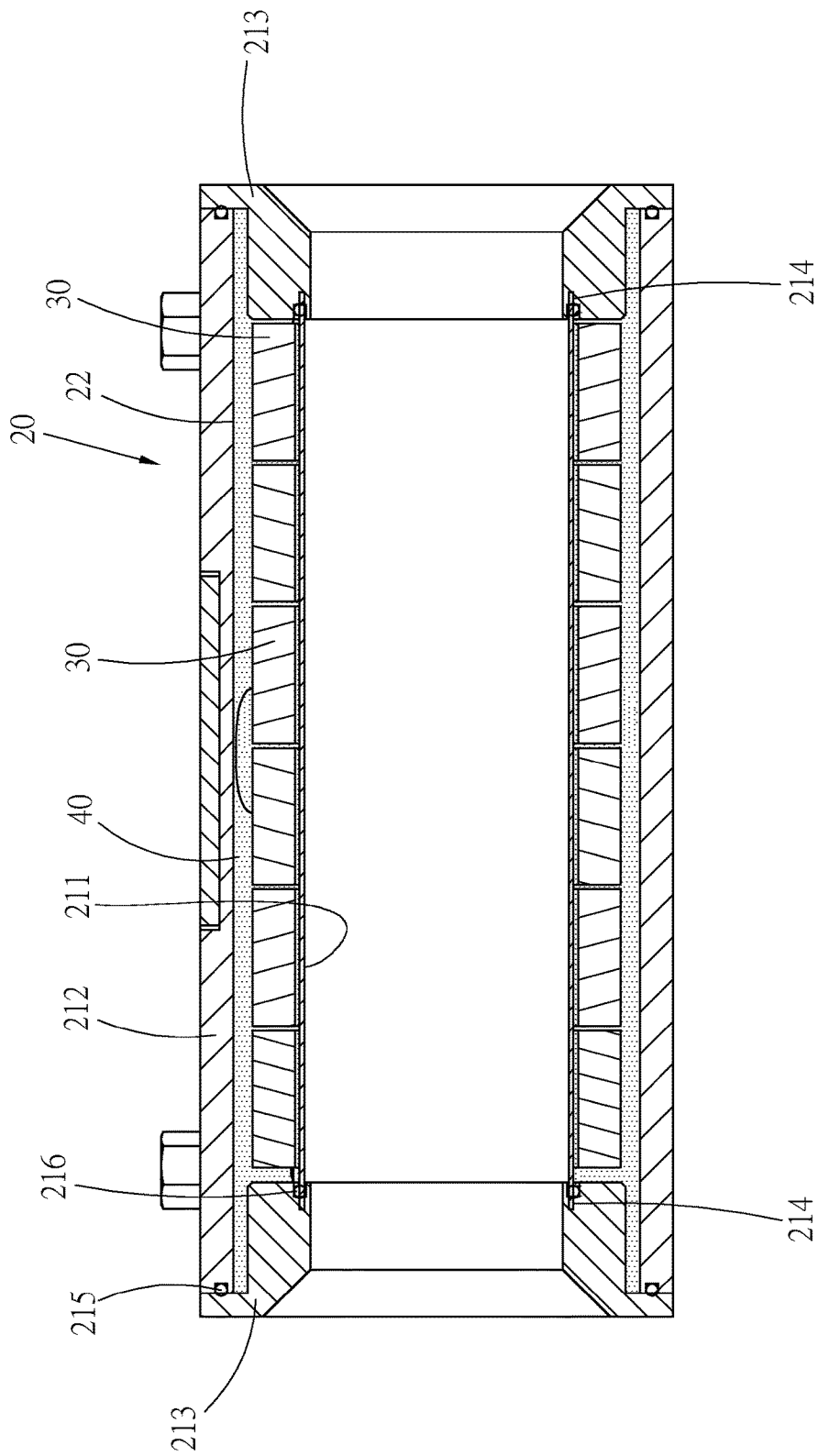
FIG. 6 is a sectional view taken along line 6-6 of FIG. 4.
Figure 7:
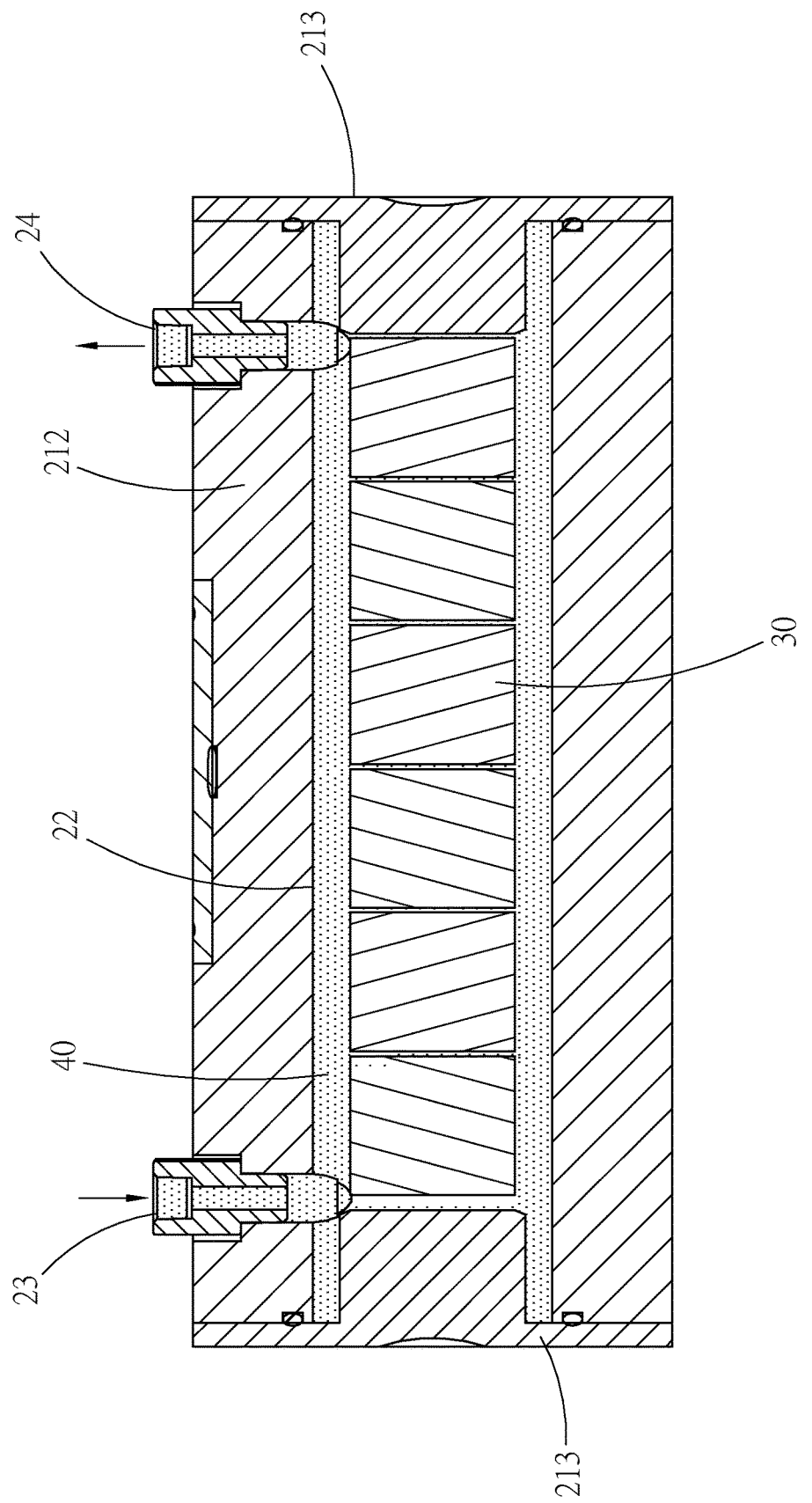
FIG. 7 is a sectional view taken along line 7-7 of FIG. 4.
Figure 8:
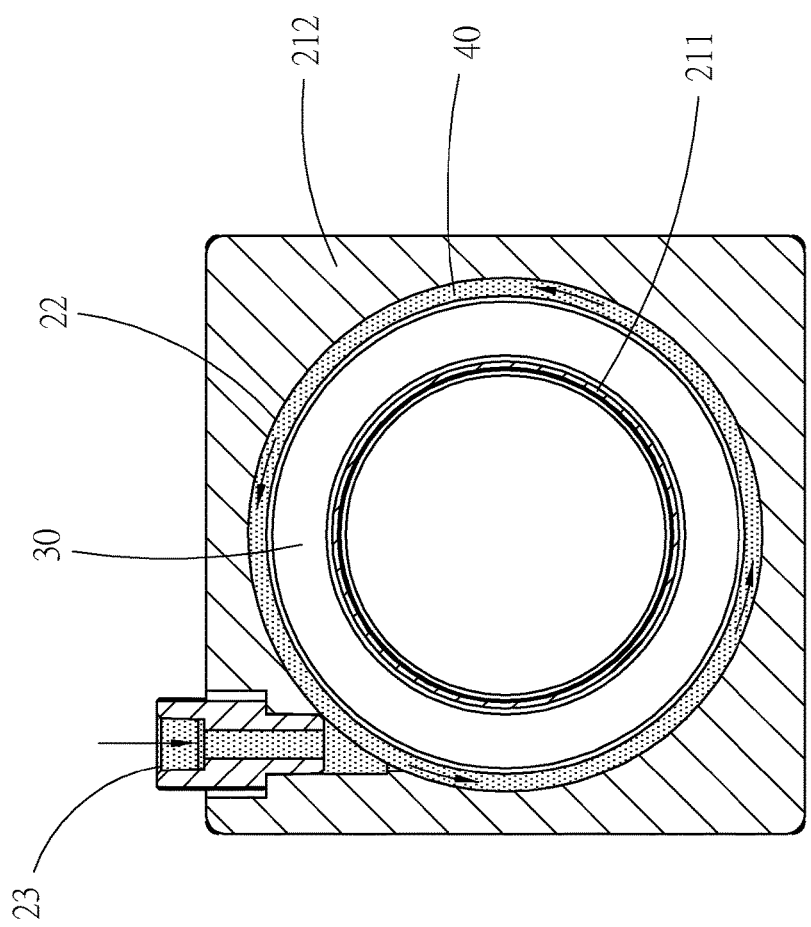
FIG. 8 is a sectional view taken along line 8-8 of FIG. 4.

Please refer to FIGS. 4 to 8. According to a preferred embodiment, the winding cooling structure 10 of shaft motor of the present invention includes a mover seat 20, multiple annular windings 30 and a cooling fluid 40.

The mover seat 20 is a tubular body section with a certain wall thickness. The mover seat 20 is coaxially fitted on the stator. A closed annular chamber 22 is formed in the mover seat 20 and coaxial with the mover seat 20.

To speak more specifically, the mover seat 20 has an inner tube 211. The inner tube 211 is a tubular body made of a complex material such as fiber glass. The inner tube 211 has a thin wall. A tubular housing 212 is coaxially fitted around the inner tube 211. Two annular end pieces 213 are respectively coaxially securely connected with two axial ends of the housing 212. Each end piece 213 has an annular insertion groove 214. Two axial ends of the inner tube 211 are respectively inserted in the insertion grooves 214, whereby the two end pieces 213 are respectively securely bridged between two ends of the housing 212 and two ends of the inner tube 211. Accordingly, the chamber 22 is defined between the inner circumference of the housing 212 and the outer circumference of the inner tube 211 and sealed by the end pieces 213.

The annular windings 30 pertain to prior art and thus will not be further described hereinafter. The annular windings 30 are only related to the technical characteristic of the present invention in that the annular windings 30 are serially connected and coaxially received in the chamber 22. The annular windings 30 are also well located in the mover seat 20.

To speak more specifically, the outer diameter of the annular windings 30 is smaller than the inner diameter of the housing 212, while the inner diameter of the annular windings 30 is slightly larger than the outer diameter of the inner tube 211. Accordingly, the space around the windings 30 is as enlarged as possible to contain the cooling fluid 40. Moreover, the end pieces 213 are securely connected with the housing 212 and the inner tube 211 to provide a holding and locating force for locate the windings 30 in the chamber 22.

The cooling fluid 40 is filled up in the chamber 22 in direct contact with the surfaces of the windings 30 positioned in the chamber 22. Accordingly, the heat generated by the windings 30 can be directly transferred to the cooling fluid 40 by way of conduction or radiation so as to lower the temperature of the windings 30.

In other words, the winding cooling structure 10 of shaft motor of the present invention is characterized in that the chamber 22 is able to receive both the windings 30 and the cooling fluid 40 therein. A certain volume of cooling fluid 40 is filled up in the chamber 22 to directly possibly contact the surfaces of every part of the respective windings 30 by largest contact area. Therefore, the windings 30 can be fully cooled. The cooling fluid 40 can be air or a coolant or any other fluid with different heat conductivity. The cooling fluid 40 is selected according to the actual heat dissipation requirement of the shaft motor.

For example, in case the heat dissipation efficiency required by the shaft motor is lower, the cooling fluid can be simply air sealed in the chamber 22 to satisfy the requirement. In contrast, in case the heat dissipation efficiency required by the shaft motor is higher, that is, the temperature of the windings 30 rises more abruptly, the cooling fluid 40 can be a coolant sealed in the chamber 22 with higher heat conductivity. Moreover, in order to further enhance the heat dissipation efficiency, no matter which kind of cooling fluid is selected, the cooling fluid is circulated between the interior of the chamber 22 and the exterior of the chamber 22 to achieve a fast heat dissipation effect.

Therefore, in the case that the cooling fluid 40 is selectively such as a coolant different from the environmental fluid outside the shaft motor, it must be ensured that the chamber 22 is isolated from the external environment to avoid leakage of the cooling fluid 40. In order to achieve this object, the mover seat 20 further includes two first sealing rings 215 respectively clamped between two ends of the housing 212 and the end pieces 213 and two second sealing rings 216 respectively clamped between the inner tube 211 and the end pieces 213. Accordingly, the end pieces 213 and the housing 212 and the inner tube 211 are airtight connected with each other to prevent the cooling fluid 40 contained in the chamber 22 from leaking.

Furthermore, in order to make the cooling fluid 40 flow between the interior and exterior of the chamber 22, the mover seat 20 further includes an inlet passage 23 and an outlet passage 24. The inlet passage 23 and the outlet passage 24 are respectively disposed on one side of the housing 212 in adjacency to two axial ends of the housing 212 in communication with the chamber 22. Accordingly, the chamber 22 is connected to an external cooling fluid supply via a pipeline (not shown), whereby the cooling fluid 40 can flow into the chamber 22 from the inlet passage 23 and flow out of the chamber 22 from the outlet passage 24. Therefore, in operation of the shaft motor, the temperature of the cooling fluid 40 contained in the chamber 22 is as lowered as possible to enhance the heat dissipation efficiency for the windings 30.

The above embodiments are only used to illustrate the present invention, not intended to limit the scope thereof. Many modifications of the above embodiments can be made without departing from the spirit of the present invention.

What is claimed is:

1. A winding cooling structure of shaft motor, comprising:
   a mover seat being a tubular body section and having a closed annular chamber being coaxially formed in the mover seat;
   multiple annular windings serially connected with each other and coaxially received in the chamber; and
   a predetermined volume of cooling fluid contained in the chamber and around the windings and filling the chamber;
   wherein the mover seat further includes an inner tube, a tubular housing coaxially fitted around the inner tube and two end pieces respectively disposed at two axial ends of the housing in abutment against two axial ends of the inner tube, an inner circumference of the housing and an outer circumference of the inner tube are spaced apart, the chamber being sealed by the end pieces;

wherein the mover seat further includes two first sealing rings respectively clamped between two ends of the housing and the end pieces and two second sealing rings respectively clamped between two ends of the inner tube and the end pieces.

2. The winding cooling structure of shaft motor as claimed in claim 1, wherein inner diameter of the housing is larger than outer diameter of the windings.

3. The winding cooling structure of shaft motor as claimed in claim 1, wherein outer diameter of the inner tube is smaller than inner diameter of the windings.

4. The winding cooling structure of shaft motor as claimed in claim 1, wherein the mover seat further includes two annular insertion grooves respectively coaxially formed on the end pieces, two axial ends of the inner tube being respectively inserted in the insertion grooves.

5. The winding cooling structure of shaft motor as claimed in claim 1, wherein cooling fluid is air or a coolant.

6. The winding cooling structure of shaft motor as claimed in claim 1, wherein the mover seat further includes an inlet passage and an outlet passage, the inlet passage and the outlet passage being spaced from each other and respectively disposed in the mover seat in communication with the chamber, whereby the cooling fluid can flow into the chamber from outer side through the inlet passage and then flow out of the chamber from the outlet passage.

7. The winding cooling structure of shaft motor as claimed in claim 6, wherein the inlet passage and the outlet passage are respectively positioned on one side of the mover seat in adjacency to two axial ends thereof.

* * * * *